United States Patent
Ertan et al.

(10) Patent No.: US 12,078,748 B2
(45) Date of Patent: Sep. 3, 2024

(54) METHOD AND SYSTEM FOR INTEFRENCE MANAGEMENT FOR DIGITAL RADARS

(71) Applicant: UHNDER, INC., Austin, TX (US)

(72) Inventors: Ali Erdem Ertan, Austin, TX (US);
Murtaza Ali, Cedar Park, TX (US);
Monier Maher, St. Louis, MO (US);
Aria Eshraghi, Austin, TX (US);
Curtis Davis, St. Louis, MO (US)

(73) Assignee: Uhnder, Inc., Austin, TX (US)

( * ) Notice: Subject to any disclaimer, the term of this patent is extended or adjusted under 35 U.S.C. 154(b) by 191 days.

(21) Appl. No.: 17/148,004

(22) Filed: Jan. 13, 2021

(65) Prior Publication Data

US 2021/0215820 A1 Jul. 15, 2021

Related U.S. Application Data

(60) Provisional application No. 62/960,220, filed on Jan. 13, 2020.

(51) Int. Cl.
*G01S 7/35* (2006.01)
*G01S 7/02* (2006.01)
(Continued)

(52) U.S. Cl.
CPC .............. *G01S 7/352* (2013.01); *G01S 7/023* (2013.01); *G01S 7/4004* (2013.01); *G01S 13/34* (2013.01);
(Continued)

(58) Field of Classification Search
CPC ........ G01S 7/352; G01S 7/023; G01S 7/4004; G01S 13/34; G01S 13/584; G01S 13/588; G01S 13/931; G01S 7/356; H01Q 3/267
(Continued)

(56) References Cited

U.S. PATENT DOCUMENTS

| | | | |
|---|---|---|---|
| 1,882,128 | A | 10/1932 | Fearing |
| 3,374,478 | A | 3/1968 | Blau |

(Continued)

FOREIGN PATENT DOCUMENTS

| | | |
|---|---|---|
| EP | 0509843 | 10/1992 |
| EP | 1826586 | 8/2007 |
| EP | 0725480 | 11/2011 |
| EP | 2374217 | 4/2013 |
| EP | 2884299 | 6/2015 |
| EP | 2821808 | 7/2015 |

(Continued)

OTHER PUBLICATIONS

Chambers et al., An article entitled "Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.

(Continued)

*Primary Examiner* — Nuzhat Pervin
(74) *Attorney, Agent, or Firm* — Gardner, Linn, Burkhart & Ondersma LLP

(57) ABSTRACT

A radar system includes an interference manager. The interference manager detects the presence and the characteristics of interfering radio signals used by other radar systems in proximity. The interference manager also controls the operating characteristics of the radar system in response to the detected interfering signal characteristics. The interference manager selects a time slot, or a frequency band, or a time slot and a frequency band to avoid or mitigate the interfering radio signals from other radar systems.

20 Claims, 12 Drawing Sheets

(51) Int. Cl.
  *G01S 7/28* (2006.01)
  *G01S 7/32* (2006.01)
  *G01S 7/40* (2006.01)
  *G01S 13/34* (2006.01)
  *G01S 13/36* (2006.01)
  *G01S 13/42* (2006.01)
  *G01S 13/58* (2006.01)
  *G01S 13/87* (2006.01)
  *G01S 13/931* (2020.01)
  *H01Q 3/26* (2006.01)

(52) U.S. Cl.
  CPC .......... *G01S 13/584* (2013.01); *G01S 13/588* (2013.01); *G01S 13/931* (2013.01); *H01Q 3/267* (2013.01); *G01S 7/28* (2013.01); *G01S 7/32* (2013.01); *G01S 7/356* (2021.05); *G01S 13/36* (2013.01); *G01S 13/42* (2013.01); *G01S 13/878* (2013.01); *G01S 2013/93271* (2020.01); *G01S 2013/93272* (2020.01)

(58) Field of Classification Search
  USPC ........................................................ 342/115
  See application file for complete search history.

(56) References Cited

U.S. PATENT DOCUMENTS

| | | |
|---|---|---|
| 3,735,398 A | 5/1973 | Ross |
| 3,750,169 A | 7/1973 | Strenglein |
| 3,766,554 A | 10/1973 | Tresselt |
| 3,896,434 A | 7/1975 | Sirven |
| 3,932,871 A | 1/1976 | Foote |
| 4,078,234 A | 3/1978 | Fishbein et al. |
| 4,176,351 A | 11/1979 | Vita et al. |
| 4,308,536 A | 12/1981 | Sims, Jr. et al. |
| 4,566,010 A | 1/1986 | Collins |
| 4,612,547 A | 9/1986 | Itoh |
| 4,882,668 A | 11/1989 | Schmid et al. |
| 4,910,464 A | 3/1990 | Trett et al. |
| 4,939,685 A | 7/1990 | Feintuch |
| 5,001,486 A | 3/1991 | Bächtiger |
| 5,012,254 A | 4/1991 | Thompson |
| 5,034,906 A | 7/1991 | Chang |
| 5,087,918 A | 2/1992 | May et al. |
| 5,151,702 A | 9/1992 | Urkowitz |
| 5,175,710 A | 12/1992 | Hutson |
| 5,218,619 A | 6/1993 | Dent |
| 5,272,663 A | 12/1993 | Jones et al. |
| 5,280,288 A | 1/1994 | Sherry et al. |
| 5,302,956 A | 4/1994 | Asbury et al. |
| 5,341,141 A | 8/1994 | Frazier et al. |
| 5,345,470 A | 9/1994 | Alexander |
| 5,361,072 A | 11/1994 | Barrick et al. |
| 5,376,939 A | 12/1994 | Urkowitz |
| 5,379,322 A | 1/1995 | Kosaka et al. |
| 5,497,162 A | 3/1996 | Kaiser |
| 5,508,706 A | 4/1996 | Tsou et al. |
| 5,581,464 A | 12/1996 | Woll et al. |
| 5,654,715 A | 8/1997 | Hayashikura et al. |
| 5,657,021 A | 8/1997 | Ehsani-Nategh et al. |
| 5,657,023 A | 8/1997 | Lewis et al. |
| 5,691,724 A | 11/1997 | Aker et al. |
| 5,712,640 A | 1/1998 | Andou |
| 5,724,041 A | 3/1998 | Inoue et al. |
| 5,847,661 A | 12/1998 | Ricci |
| 5,892,477 A | 4/1999 | Wehling |
| 5,917,430 A | 6/1999 | Greneker, III et al. |
| 5,920,278 A * | 7/1999 | Tyler .......... G01S 5/14 342/36 |
| 5,920,285 A | 7/1999 | Benjamin |
| 5,931,893 A | 8/1999 | Dent et al. |
| 5,959,571 A | 9/1999 | Aoyagi et al. |
| 5,970,400 A | 10/1999 | Dwyer |
| 6,048,315 A | 4/2000 | Chiao et al. |
| 6,067,314 A | 5/2000 | Azuma |
| 6,069,581 A | 5/2000 | Bell et al. |
| 6,121,872 A | 9/2000 | Weishaupt |
| 6,121,918 A | 9/2000 | Tullsson |
| 6,151,366 A | 11/2000 | Yip |
| 6,163,252 A | 12/2000 | Nishiwaki |
| 6,184,829 B1 | 2/2001 | Stilp |
| 6,191,726 B1 | 2/2001 | Tullsson |
| 6,208,248 B1 | 3/2001 | Ross |
| 6,288,672 B1 | 9/2001 | Asano et al. |
| 6,307,622 B1 | 10/2001 | Lewis |
| 6,335,700 B1 | 1/2002 | Ashihara |
| 6,347,264 B2 | 2/2002 | Nicosia et al. |
| 6,400,308 B1 | 6/2002 | Bell et al. |
| 6,411,250 B1 | 6/2002 | Oswald et al. |
| 6,417,796 B1 | 7/2002 | Bowlds |
| 6,424,289 B2 | 7/2002 | Fukae et al. |
| 6,547,733 B2 | 4/2003 | Hwang et al. |
| 6,583,753 B1 | 6/2003 | Reed |
| 6,614,387 B1 | 9/2003 | Deadman |
| 6,624,784 B1 | 9/2003 | Yamaguchi |
| 6,674,908 B1 | 1/2004 | Aronov |
| 6,683,560 B2 | 1/2004 | Bauhahn |
| 6,693,582 B2 | 2/2004 | Steinlechner et al. |
| 6,714,956 B1 | 3/2004 | Liu et al. |
| 6,747,595 B2 | 6/2004 | Hirabe |
| 6,768,391 B1 | 7/2004 | Dent et al. |
| 6,865,218 B1 | 3/2005 | Sourour |
| 6,888,491 B2 | 5/2005 | Richter |
| 6,975,246 B1 | 12/2005 | Trudeau |
| 7,066,886 B2 | 6/2006 | Song et al. |
| 7,119,739 B1 | 10/2006 | Struckman |
| 7,130,663 B2 | 10/2006 | Guo |
| 7,202,776 B2 | 4/2007 | Breed |
| 7,289,058 B2 | 10/2007 | Shima |
| 7,299,251 B2 | 11/2007 | Skidmore et al. |
| 7,338,450 B2 | 3/2008 | Kristofferson et al. |
| 7,395,084 B2 | 7/2008 | Anttila |
| 7,460,055 B2 | 12/2008 | Nishijima et al. |
| 7,474,258 B1 | 1/2009 | Arikan et al. |
| 7,545,310 B2 | 6/2009 | Matsuoka |
| 7,545,321 B2 | 6/2009 | Kawasaki |
| 7,564,400 B2 | 7/2009 | Fukuda |
| 7,567,204 B2 | 7/2009 | Sakamoto |
| 7,609,198 B2 | 10/2009 | Chang |
| 7,642,952 B2 | 1/2010 | Fukuda |
| 7,663,533 B2 | 2/2010 | Toennesen |
| 7,667,637 B2 | 2/2010 | Pedersen et al. |
| 7,728,762 B2 | 6/2010 | Sakamoto |
| 7,791,528 B2 | 9/2010 | Klotzbuecher |
| 7,847,731 B2 | 12/2010 | Wiesbeck et al. |
| 7,855,677 B2 | 12/2010 | Negoro et al. |
| 7,859,450 B2 | 12/2010 | Shirakawa et al. |
| 8,019,352 B2 | 9/2011 | Rappaport et al. |
| 8,044,845 B2 | 10/2011 | Saunders |
| 8,049,663 B2 | 11/2011 | Frank et al. |
| 8,059,026 B1 | 11/2011 | Nunez |
| 8,102,306 B2 | 1/2012 | Smith, Jr. et al. |
| 8,115,672 B2 | 2/2012 | Nouvel et al. |
| 8,154,436 B2 | 4/2012 | Szajnowski |
| 8,169,359 B2 | 5/2012 | Aoyagi |
| 8,212,713 B2 | 7/2012 | Aiga et al. |
| 8,330,650 B2 | 12/2012 | Goldman |
| 8,390,507 B2 | 3/2013 | Wintermantel |
| 8,471,760 B2 | 6/2013 | Szajnowski |
| 8,532,159 B2 | 9/2013 | Kagawa et al. |
| 8,547,988 B2 | 10/2013 | Hadani et al. |
| 8,686,894 B2 | 4/2014 | Fukuda et al. |
| 8,694,306 B1 | 4/2014 | Short et al. |
| 8,994,581 B1 | 3/2015 | Brown |
| 9,121,943 B2 | 9/2015 | Stirlin-Gallacher et al. |
| 9,194,946 B1 * | 11/2015 | Vacanti .................. G01S 13/286 |
| 9,239,378 B2 | 1/2016 | Kishigami et al. |
| 9,239,379 B2 | 1/2016 | Burgio et al. |
| 9,274,217 B2 | 3/2016 | Chang et al. |
| 9,282,945 B2 | 3/2016 | Smith et al. |
| 9,335,402 B2 | 5/2016 | Maeno et al. |
| 9,400,328 B2 | 7/2016 | Hsiao et al. |
| 9,541,639 B2 | 1/2017 | Searcy et al. |

(56) References Cited

U.S. PATENT DOCUMENTS

| | | | |
|---|---|---|---|
| 9,568,600 | B2 | 2/2017 | Alland |
| 9,575,160 | B1 | 2/2017 | Davis et al. |
| 9,599,702 | B1 | 3/2017 | Bordes et al. |
| 9,689,967 | B1 | 6/2017 | Stark et al. |
| 9,720,073 | B1 | 8/2017 | Davis et al. |
| 9,720,080 | B1 | 9/2017 | Rodenbeck |
| 9,753,121 | B1 | 9/2017 | Davis |
| 9,753,132 | B1 | 9/2017 | Bordes et al. |
| 9,772,397 | B1* | 9/2017 | Bordes .................. G01S 7/0232 |
| 9,791,551 | B1 | 10/2017 | Eshraghi et al. |
| 9,791,564 | B1 | 10/2017 | Harris et al. |
| 9,806,914 | B1 | 10/2017 | Bordes et al. |
| 9,829,567 | B1 | 11/2017 | Davis et al. |
| 9,846,228 | B2 | 12/2017 | Davis et al. |
| 9,869,762 | B1 | 1/2018 | Alland et al. |
| 10,092,192 | B2 | 10/2018 | Lashkari et al. |
| 10,215,853 | B2 | 2/2019 | Start et al. |
| 10,594,916 | B2* | 3/2020 | Sivan ...................... H04W 4/80 |
| 10,805,933 | B2* | 10/2020 | Stephens ............... H04W 72/54 |
| 10,812,985 | B2* | 10/2020 | Mody ................... H04L 5/0091 |
| 11,105,890 | B2 | 8/2021 | Behrens et al. |
| 2001/0002919 | A1 | 6/2001 | Sourour et al. |
| 2002/0004692 | A1 | 1/2002 | Nicosia et al. |
| 2002/0044082 | A1 | 4/2002 | Woodington et al. |
| 2002/0075178 | A1 | 6/2002 | Woodington et al. |
| 2002/0118522 | A1 | 8/2002 | Ho et al. |
| 2002/0130811 | A1 | 9/2002 | Voigtlaender |
| 2002/0147534 | A1 | 10/2002 | Delcheccolo et al. |
| 2002/0155811 | A1 | 10/2002 | Prismantas |
| 2003/0001772 | A1 | 1/2003 | Woodington et al. |
| 2003/0011519 | A1 | 1/2003 | Breglia et al. |
| 2003/0058166 | A1 | 3/2003 | Hirabe |
| 2003/0073463 | A1 | 4/2003 | Shapira |
| 2003/0080713 | A1 | 5/2003 | Kirmuss |
| 2003/0102997 | A1 | 6/2003 | Levin et al. |
| 2003/0228890 | A1* | 12/2003 | Falaki ................... H04W 88/06 |
| | | | 455/574 |
| 2003/0235244 | A1 | 12/2003 | Pessoa et al. |
| 2004/0012516 | A1 | 1/2004 | Schiffmann |
| 2004/0015529 | A1 | 1/2004 | Tanrikulu et al. |
| 2004/0066323 | A1 | 4/2004 | Richter |
| 2004/0070532 | A1 | 4/2004 | Ishii et al. |
| 2004/0107030 | A1 | 6/2004 | Nishira et al. |
| 2004/0138802 | A1 | 7/2004 | Kuragaki et al. |
| 2004/0215373 | A1 | 10/2004 | Won et al. |
| 2005/0008065 | A1 | 1/2005 | Schilling |
| 2005/0069162 | A1 | 3/2005 | Haykin |
| 2005/0090274 | A1 | 4/2005 | Miyashita |
| 2005/0156780 | A1 | 7/2005 | Bonthron et al. |
| 2005/0201457 | A1 | 9/2005 | Allred et al. |
| 2005/0225476 | A1 | 10/2005 | Hoetzel et al. |
| 2005/0273480 | A1 | 12/2005 | Pugh et al. |
| 2006/0012511 | A1 | 1/2006 | Dooi et al. |
| 2006/0036353 | A1 | 2/2006 | Wintermantel |
| 2006/0050707 | A1 | 3/2006 | Sterin |
| 2006/0093078 | A1 | 5/2006 | Lewis et al. |
| 2006/0109170 | A1* | 5/2006 | Voigtlaender ......... G01S 13/931 |
| | | | 342/159 |
| 2006/0109931 | A1 | 5/2006 | Asai |
| 2006/0114324 | A1 | 6/2006 | Farmer et al. |
| 2006/0140249 | A1 | 6/2006 | Kohno |
| 2006/0181448 | A1 | 8/2006 | Natsume et al. |
| 2006/0220943 | A1 | 10/2006 | Schlick et al. |
| 2006/0244653 | A1 | 11/2006 | Szajnowski |
| 2006/0262007 | A1 | 11/2006 | Bonthron |
| 2006/0262009 | A1 | 11/2006 | Watanabe |
| 2007/0018884 | A1 | 1/2007 | Adams |
| 2007/0018886 | A1 | 1/2007 | Watanabe et al. |
| 2007/0096885 | A1 | 5/2007 | Cheng et al. |
| 2007/0109175 | A1 | 5/2007 | Fukuda |
| 2007/0115869 | A1 | 5/2007 | Lakkis |
| 2007/0120731 | A1 | 5/2007 | Kelly, Jr. et al. |
| 2007/0132633 | A1 | 6/2007 | Uchino |
| 2007/0152870 | A1 | 7/2007 | Woodington et al. |
| 2007/0152871 | A1 | 7/2007 | Puglia |
| 2007/0152872 | A1 | 7/2007 | Woodington |
| 2007/0164896 | A1 | 7/2007 | Suzuki et al. |
| 2007/0171122 | A1 | 7/2007 | Nakano |
| 2007/0182619 | A1 | 8/2007 | Honda et al. |
| 2007/0182623 | A1 | 8/2007 | Zeng |
| 2007/0188373 | A1 | 8/2007 | Shirakawa et al. |
| 2007/0200747 | A1 | 8/2007 | Okai |
| 2007/0263748 | A1 | 11/2007 | Mesecher |
| 2007/0279303 | A1 | 12/2007 | Schoebel |
| 2008/0080599 | A1 | 4/2008 | Kang |
| 2008/0088499 | A1 | 4/2008 | Bonthron |
| 2008/0094274 | A1 | 4/2008 | Nakanishi |
| 2008/0106458 | A1* | 5/2008 | Honda .................... G01S 7/023 |
| | | | 342/59 |
| 2008/0150790 | A1 | 6/2008 | Voigtlaender et al. |
| 2008/0180311 | A1 | 7/2008 | Mikami |
| 2008/0208472 | A1 | 8/2008 | Morcom |
| 2008/0218406 | A1 | 9/2008 | Nakanishi |
| 2008/0258964 | A1 | 10/2008 | Schoeberl |
| 2008/0272955 | A1 | 11/2008 | Yonak et al. |
| 2009/0003412 | A1 | 1/2009 | Negoro et al. |
| 2009/0015459 | A1 | 1/2009 | Mahler et al. |
| 2009/0015464 | A1 | 1/2009 | Fukuda |
| 2009/0027257 | A1 | 1/2009 | Arikan |
| 2009/0046000 | A1 | 2/2009 | Matsuoka |
| 2009/0051581 | A1 | 2/2009 | Hatono |
| 2009/0072957 | A1 | 3/2009 | Wu et al. |
| 2009/0073025 | A1 | 3/2009 | Inoue et al. |
| 2009/0074031 | A1 | 3/2009 | Fukuda |
| 2009/0079617 | A1 | 3/2009 | Shirakawa et al. |
| 2009/0085827 | A1 | 4/2009 | Orime et al. |
| 2009/0103593 | A1 | 4/2009 | Bergamo |
| 2009/0121918 | A1 | 5/2009 | Shirai et al. |
| 2009/0212998 | A1 | 8/2009 | Szajnowski |
| 2009/0237293 | A1 | 9/2009 | Sakuma |
| 2009/0254260 | A1 | 10/2009 | Nix et al. |
| 2009/0267822 | A1 | 10/2009 | Shinoda et al. |
| 2009/0289831 | A1 | 11/2009 | Akita |
| 2009/0295623 | A1 | 12/2009 | Falk |
| 2010/0001897 | A1 | 1/2010 | Lyman |
| 2010/0019950 | A1 | 1/2010 | Yamano et al. |
| 2010/0039311 | A1 | 2/2010 | Woodington et al. |
| 2010/0075704 | A1* | 3/2010 | McHenry ............. H04W 16/14 |
| | | | 455/67.11 |
| 2010/0116365 | A1 | 5/2010 | McCarty |
| 2010/0156690 | A1 | 6/2010 | Kim et al. |
| 2010/0198513 | A1 | 8/2010 | Zeng et al. |
| 2010/0253573 | A1 | 10/2010 | Holzheimer et al. |
| 2010/0277359 | A1 | 11/2010 | Ando |
| 2010/0289692 | A1 | 11/2010 | Winkler |
| 2011/0006944 | A1 | 1/2011 | Goldman |
| 2011/0032138 | A1 | 2/2011 | Krapf |
| 2011/0074620 | A1 | 3/2011 | Wintermantel |
| 2011/0187600 | A1 | 8/2011 | Landt |
| 2011/0196568 | A1 | 8/2011 | Nickolaou |
| 2011/0234448 | A1 | 9/2011 | Hayase |
| 2011/0248796 | A1 | 10/2011 | Pozgay |
| 2011/0279303 | A1 | 11/2011 | Smith, Jr. et al. |
| 2011/0279307 | A1 | 11/2011 | Song |
| 2011/0285576 | A1 | 11/2011 | Lynam |
| 2011/0291874 | A1 | 12/2011 | De Mersseman |
| 2011/0291875 | A1 | 12/2011 | Szajnowski |
| 2011/0292971 | A1 | 12/2011 | Hadani et al. |
| 2011/0298653 | A1 | 12/2011 | Mizutani |
| 2012/0001791 | A1 | 1/2012 | Wintermantel |
| 2012/0050092 | A1 | 3/2012 | Lee et al. |
| 2012/0050093 | A1 | 3/2012 | Heilmann et al. |
| 2012/0105268 | A1 | 5/2012 | Smits et al. |
| 2012/0112957 | A1 | 5/2012 | Nguyen et al. |
| 2012/0133547 | A1 | 5/2012 | MacDonald et al. |
| 2012/0146834 | A1 | 6/2012 | Karr |
| 2012/0173246 | A1 | 7/2012 | Choi et al. |
| 2012/0195349 | A1 | 8/2012 | Lakkis |
| 2012/0249356 | A1 | 10/2012 | Shope |
| 2012/0257643 | A1 | 10/2012 | Wu et al. |
| 2012/0283987 | A1 | 11/2012 | Busking et al. |
| 2012/0314799 | A1 | 12/2012 | In De Betou et al. |
| 2012/0319900 | A1 | 12/2012 | Johansson et al. |
| 2013/0016761 | A1 | 1/2013 | Nentwig |

(56) References Cited

U.S. PATENT DOCUMENTS

| | | |
|---|---|---|
| 2013/0021196 A1 | 1/2013 | Himmelstoss |
| 2013/0027240 A1 | 1/2013 | Chowdhury |
| 2013/0057436 A1 | 3/2013 | Krasner et al. |
| 2013/0069818 A1 | 3/2013 | Shirakawa et al. |
| 2013/0102254 A1 | 4/2013 | Cyzs |
| 2013/0113647 A1 | 5/2013 | Sentelle et al. |
| 2013/0113652 A1 | 5/2013 | Smits et al. |
| 2013/0113653 A1 | 5/2013 | Kishigami et al. |
| 2013/0135140 A1 | 5/2013 | Kishigami |
| 2013/0169468 A1 | 7/2013 | Johnson et al. |
| 2013/0169485 A1 | 7/2013 | Lynch |
| 2013/0176154 A1 | 7/2013 | Bonaccio et al. |
| 2013/0214961 A1 | 8/2013 | Lee et al. |
| 2013/0229301 A1 | 9/2013 | Kanamoto |
| 2013/0244710 A1 | 9/2013 | Nguyen et al. |
| 2013/0249730 A1 | 9/2013 | Adcook |
| 2013/0314271 A1 | 11/2013 | Braswell et al. |
| 2013/0321196 A1 | 12/2013 | Binzer et al. |
| 2014/0022108 A1 | 1/2014 | Alberth, Jr. et al. |
| 2014/0028491 A1 | 1/2014 | Ferguson |
| 2014/0035774 A1 | 2/2014 | Khlifi |
| 2014/0049423 A1 | 2/2014 | De Jong et al. |
| 2014/0070985 A1 | 3/2014 | Vacanti |
| 2014/0085128 A1 | 3/2014 | Kishigami et al. |
| 2014/0097987 A1 | 4/2014 | Worl et al. |
| 2014/0111367 A1 | 4/2014 | Kishigami et al. |
| 2014/0111372 A1 | 4/2014 | Wu |
| 2014/0139322 A1 | 5/2014 | Wang et al. |
| 2014/0159948 A1 | 6/2014 | Ishimori et al. |
| 2014/0220903 A1 | 8/2014 | Schulz et al. |
| 2014/0253345 A1 | 9/2014 | Breed |
| 2014/0253364 A1 | 9/2014 | Lee et al. |
| 2014/0285373 A1 | 9/2014 | Kuwahara et al. |
| 2014/0316261 A1 | 10/2014 | Lux et al. |
| 2014/0327566 A1 | 11/2014 | Burgio et al. |
| 2014/0327570 A1* | 11/2014 | Beyer .................. G01S 7/4021 342/26 R |
| 2014/0340254 A1 | 11/2014 | Hesse |
| 2014/0348253 A1 | 11/2014 | Mobasher et al. |
| 2014/0350815 A1 | 11/2014 | Kambe |
| 2015/0002329 A1 | 1/2015 | Murad et al. |
| 2015/0002357 A1 | 1/2015 | Sanford et al. |
| 2015/0035662 A1 | 2/2015 | Bowers et al. |
| 2015/0061922 A1 | 3/2015 | Kishigami |
| 2015/0103745 A1 | 4/2015 | Negus et al. |
| 2015/0153445 A1 | 6/2015 | Jansen |
| 2015/0160335 A1 | 6/2015 | Lynch et al. |
| 2015/0198709 A1 | 7/2015 | Inoue |
| 2015/0204966 A1 | 7/2015 | Kishigami |
| 2015/0204971 A1 | 7/2015 | Yoshimura et al. |
| 2015/0204972 A1 | 7/2015 | Kuehnle et al. |
| 2015/0226848 A1 | 8/2015 | Park |
| 2015/0234045 A1 | 8/2015 | Rosenblum |
| 2015/0247924 A1 | 9/2015 | Kishigami |
| 2015/0255867 A1 | 9/2015 | Inoue |
| 2015/0301172 A1 | 10/2015 | Ossowska |
| 2015/0323660 A1 | 11/2015 | Hampikian |
| 2015/0331090 A1 | 11/2015 | Jeong et al. |
| 2015/0369912 A1 | 12/2015 | Kishigami et al. |
| 2016/0003938 A1 | 1/2016 | Gazit et al. |
| 2016/0003939 A1 | 1/2016 | Stainvas Olshansky et al. |
| 2016/0018511 A1 | 1/2016 | Nayyar et al. |
| 2016/0025844 A1 | 1/2016 | Mckitterick et al. |
| 2016/0033631 A1 | 2/2016 | Searcy et al. |
| 2016/0033632 A1 | 2/2016 | Searcy et al. |
| 2016/0041260 A1 | 2/2016 | Cao et al. |
| 2016/0054441 A1 | 2/2016 | Kuo et al. |
| 2016/0061935 A1 | 3/2016 | McCloskey et al. |
| 2016/0084941 A1 | 3/2016 | Arage |
| 2016/0084943 A1 | 3/2016 | Arage |
| 2016/0091595 A1 | 3/2016 | Alcalde |
| 2016/0103206 A1 | 4/2016 | Pavao-Moreira et al. |
| 2016/0124075 A1 | 5/2016 | Vogt et al. |
| 2016/0124086 A1 | 5/2016 | Jansen et al. |
| 2016/0131752 A1 | 5/2016 | Jansen et al. |
| 2016/0139254 A1 | 5/2016 | Wittenberg |
| 2016/0146931 A1 | 5/2016 | Rao et al. |
| 2016/0154103 A1 | 6/2016 | Moriuchi |
| 2016/0178732 A1 | 6/2016 | Oka et al. |
| 2016/0213258 A1 | 7/2016 | Lashkari et al. |
| 2016/0223643 A1* | 8/2016 | Li .................. G01S 7/0236 |
| 2016/0223644 A1 | 8/2016 | Soga |
| 2016/0238694 A1 | 8/2016 | Kishigami |
| 2016/0291130 A1* | 10/2016 | Ginsburg ............... G01S 13/32 |
| 2016/0349365 A1 | 12/2016 | Ling |
| 2017/0010361 A1 | 1/2017 | Tanaka |
| 2017/0023661 A1 | 1/2017 | Richert |
| 2017/0023663 A1 | 1/2017 | Subburaj et al. |
| 2017/0074980 A1 | 3/2017 | Adib |
| 2017/0090015 A1 | 3/2017 | Breen et al. |
| 2017/0117950 A1 | 4/2017 | Strong |
| 2017/0153315 A1* | 6/2017 | Katayama ............... G01S 13/38 |
| 2017/0153316 A1 | 6/2017 | Wintermantel |
| 2017/0212213 A1 | 7/2017 | Kishigami |
| 2017/0219689 A1 | 8/2017 | Hung et al. |
| 2017/0223712 A1* | 8/2017 | Stephens ............... H04L 67/125 |
| 2017/0234968 A1 | 8/2017 | Roger et al. |
| 2017/0293025 A1 | 10/2017 | Davis et al. |
| 2017/0293027 A1 | 10/2017 | Stark et al. |
| 2017/0307728 A1 | 10/2017 | Eshraghi et al. |
| 2017/0307729 A1* | 10/2017 | Eshraghi ............... G01S 7/2813 |
| 2017/0309997 A1 | 10/2017 | Alland et al. |
| 2017/0310758 A1 | 10/2017 | Davis et al. |
| 2017/0336495 A1 | 11/2017 | Davis et al. |
| 2018/0003799 A1 | 1/2018 | Yang et al. |
| 2018/0019755 A1 | 1/2018 | Josefsberg et al. |
| 2018/0175907 A1 | 1/2018 | Marr |
| 2018/0031674 A1* | 2/2018 | Bordes ................ G01S 7/0234 |
| 2018/0074168 A1 | 3/2018 | Subburaj et al. |
| 2018/0081029 A1* | 3/2018 | Davis .................... G01S 13/931 |
| 2018/0095161 A1* | 4/2018 | Kellum .................. G01S 13/10 |
| 2018/0095163 A1 | 4/2018 | Lovberg et al. |
| 2018/0113191 A1 | 4/2018 | Villeval et al. |
| 2018/0149730 A1 | 5/2018 | Li et al. |
| 2018/0294908 A1 | 10/2018 | Abdelmonem |
| 2019/0056476 A1* | 2/2019 | Lin ........................ G01S 7/021 |
| 2019/0072641 A1 | 3/2019 | Al-Stouhi et al. |
| 2019/0187245 A1* | 6/2019 | Guarin Aristizabal ...................... G01S 13/931 |
| 2019/0219685 A1 | 7/2019 | Shan |
| 2019/0271776 A1* | 9/2019 | Davis ...................... G01S 13/87 |
| 2019/0377077 A1* | 12/2019 | Kitayama ............. G01S 7/0232 |
| 2020/0036487 A1* | 1/2020 | Hammond ............ H04L 5/0012 |
| 2020/0064455 A1 | 2/2020 | Schroder et al. |
| 2020/0107249 A1* | 4/2020 | Stauffer ................ H04W 48/14 |
| 2020/0393536 A1* | 12/2020 | Stettiner ............... G01S 13/343 |
| 2021/0181300 A1* | 6/2021 | Choi .................... H03L 7/0818 |
| 2021/0190905 A1* | 6/2021 | Roger .................. G01S 13/536 |
| 2022/0365169 A1* | 11/2022 | Lefevre ................ G01S 7/0235 |

FOREIGN PATENT DOCUMENTS

| | | | |
|---|---|---|---|
| EP | 3062446 B1 * | 9/2018 | ............... H04B 1/10 |
| EP | 3152956 B1 * | 3/2019 | ........... H04L 67/125 |
| FR | 2751086 | 1/1998 | |
| GB | 2529029 A * | 2/2016 | ........... H04L 67/125 |
| WO | WO2008022981 | 2/2008 | |
| WO | WO-2010022156 A2 * | 2/2010 | ............. H04B 7/022 |
| WO | WO2015175078 | 11/2015 | |
| WO | WO2015185058 | 12/2015 | |
| WO | WO2016011407 | 1/2016 | |
| WO | WO2016030656 | 3/2016 | |
| WO | WO2017059961 | 4/2017 | |
| WO | WO2017175190 | 10/2017 | |
| WO | WO2017187330 | 11/2017 | |

OTHER PUBLICATIONS

Fraser, "Design and simulation of a coded sequence ground penetrating radar," In: Diss. University of British Columbia, Dec. 3, 2015.

(56) References Cited

OTHER PUBLICATIONS

Zhou et al., "Linear extractors for extracting randomness from noisy sources," In: Information Theory Proceedings (ISIT), 2011 IEEE International Symposium on Oct. 3, 2011.

V. Giannini et al., "A 79 GHz Phase-Modulated 4 GHz-Bw Cw Radar Transmitter in 28 nm CMOS," in IEEE Journal of Solid-State Circuits, vol. 49, No. 12, pp. 2925-2937, Dec. 2014. (Year: 2014).

Óscar Faus Garcia, "Signal Processing for mm Wave MIMO Radar," University of Gavle, Faculty of Engineering and Sustainable Development, Jun. 2015; Retrieved from the Internet from http://www.diva-portal.se/smash/get/diva2:826028/FULLTEXT01.pdf.

Levanan Nadav et al., "Non-coherent pulse compression—aperiodic and periodic waveforms", IET Radar, Sonar & Navagation, The Institution of Engineering and Technology, Jan. 1, 2016, pp. 216-224, vol. 10, Iss. 1, UK.

Akihiro Kajiwara, "Stepped-FM Pulse Radar for Vehicular Collision Avoidance", Electronics and Communications in Japan, Part 1, Mar. 1998, pp. 234-239, vol. 82, No. 6 1999.

International Search Report and Written Opinion of corresponding PCT Application No. PCT/IB2021/50223, dated Oct. 27, 2021.

\* cited by examiner

FIG. 12
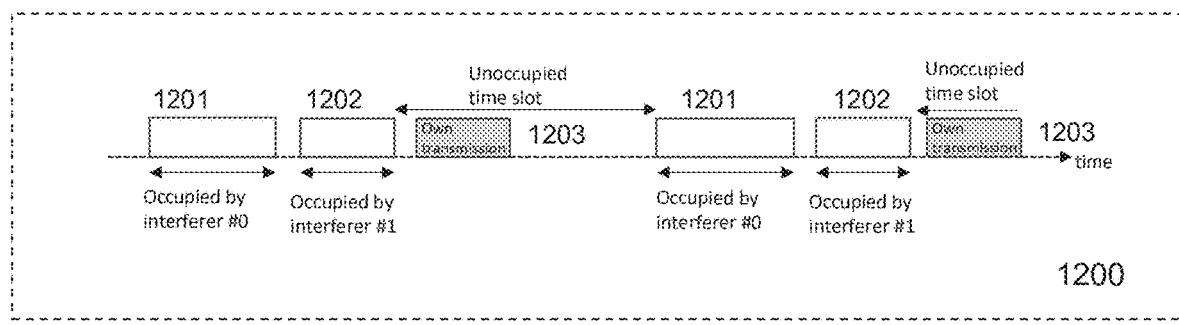
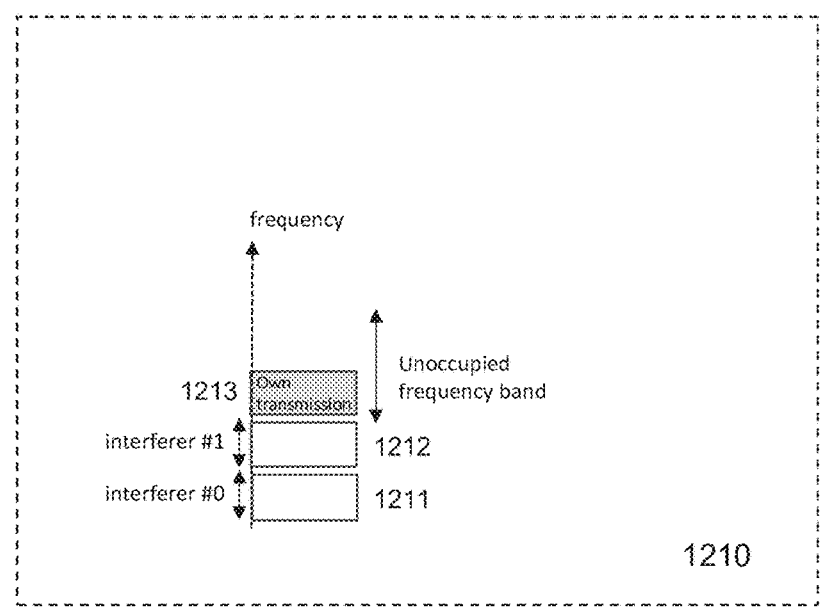
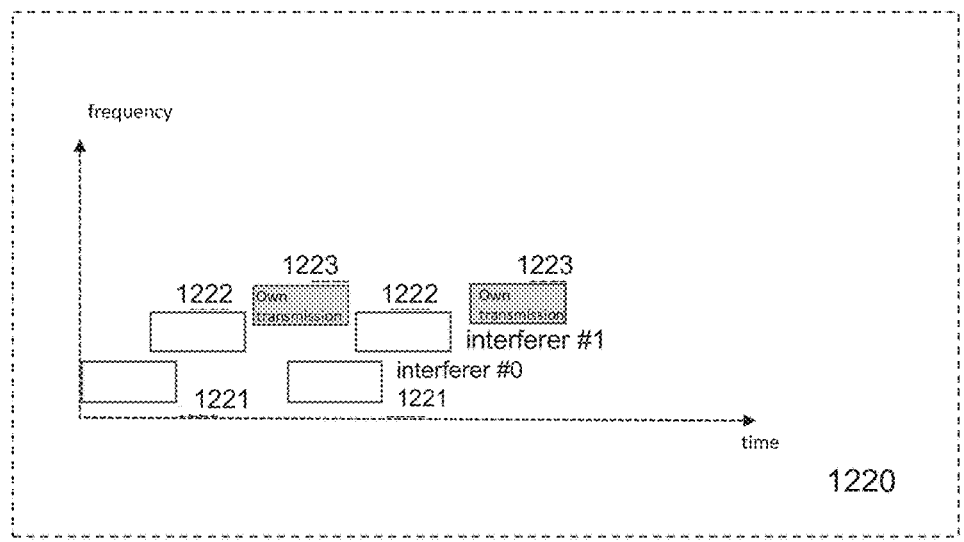

METHOD AND SYSTEM FOR INTEFRENCE MANAGEMENT FOR DIGITAL RADARS

CROSS REFERENCE TO RELATED APPLICATIONS

The present application claims the filing benefits of U.S. provisional application, Ser. No. 62/960,220, filed Jan. 13, 2020, which is hereby incorporated by reference herein in its entirety.

FIELD OF THE INVENTION

The present invention is directed to radar systems, and in particular to digital radar systems.

BACKGROUND OF THE INVENTION

The use of radar to determine location and velocity of objects in an environment is important in a number of applications including, for example, automotive radar, industrial processes, and gesture detection. A radar system typically transmits radio signals and listens for the reflection of the radio signals from objects in the environment. By comparing the transmitted radio signals with the received radio signals, a radar system can determine the distance to an object, and the velocity of the object. Using multiple transmitters and/or receivers, or a movable transmitter or receiver, the direction of an object can also be determined.

A radar system consists of transmitters and receivers. The transmitters generate a baseband signal which is up-converted to a radio frequency (RF) signal that propagates according to an antenna pattern. The transmitted signal is reflected off of objects or targets in the environment. The received signal at each receiver is the totality of the reflected signal from all targets in the environment. The receiver down-converts the received signal to baseband and compares the baseband received signal to the baseband signal at one or more transmitters. This is used to determine the range, velocity, and angle of targets in the environment.

A MIMO radar system includes a plurality of transmitters and a plurality of receivers. Each of the plurality of transmitters is coupled to a corresponding antenna, and each of the plurality of receivers is coupled to a corresponding antenna. The transmitter and receiver antennas are used to form a first set of virtual antenna locations. The more virtual antennas, the better the angular resolution.

Multiple radar systems may be operating in proximity. In this case, the received signal at each receiver of each radar system is the totality of the reflected signal from all targets in the environment plus the radio signals from other radar systems (interfering radar systems). Thus, radar systems determine the range, velocity, and angle of targets in the environment in presence of the radio signals from the interfering radar systems.

SUMMARY OF THE INVENTION

Methods and systems of the present invention provide for the detection of the presence of other radar systems in proximity (interfering radar systems) and the selection of operating parameters for its own operation. The presence of other radar systems in proximity, which have their own radio signal transmission, may act as interferers providing interfering radio signals that disturb the ability of a radar system to operate according to its specification. Similarly, the radar system may also interfere with the operations of other radar systems in proximity. A method and system in accordance with the present invention provides a radar system that determines the operating characteristics of radio signals received from interfering radar systems. The radar system selects operational parameters to circumvent or mitigate both the impact of the interfering radar systems into its own operation, as well as to circumvent or mitigate the impact of its own operation into the interfering radar systems.

A multiple input, multiple output (MIMO) radar system in accordance with an embodiment of the present invention includes an interference management system (or an interference manager). The MIMO radar system includes a plurality of transmitters and a plurality of receivers. The interference manager is configured to receive and process signal data from the transmitters and receivers to detect the presence of interference. When the interference manager determines that interference (from other radar systems) is present, the interference manager determines either a time slot, or a frequency band, or both (a time slot and frequency band), for transmitter/receiver operation to avoid the interference.

A method for managing a multiple input, multiple output (MIMO) radar system to avoid interference from other radar systems in accordance with an embodiment of the present invention includes transmitting radio signals with a plurality of transmitters and receiving radio signals with a plurality of receivers. The received radio signals include radio signals transmitted by the transmitters and reflected off objects in an environment. The received radio signals also include interfering radio signals transmitted by other radar systems. The method also includes selecting a time slot, frequency band, or both a time slot and a frequency band for transmitter/receiver operation to avoid or mitigate the interference from the other radar systems. The selected time slot or frequency band is selected as defined by the presence or absence of interfering radio signals in time slots and frequency bands.

In an aspect of the present invention, after detecting the interfering signals and/or the signal characteristics of the interfering signals, the radar system may be configured to lower transmitter power. In another aspect of the present invention, the radar system may be configured to lower receiver gain. Other aspects of the present invention include the radar system choosing the time slot or the frequency band or a combination of both time slot and frequency band to transmit its own radio signals.

BRIEF DESCRIPTION OF THE DRAWINGS

FIG. 12 shows timing and frequency graphs for an exemplary selection of an operating region of radio transmissions in accordance with the present invention;

DESCRIPTION OF THE PREFERRED EMBODIMENTS

The present invention will now be described with reference to the accompanying figures, wherein numbered elements in the following written description correspond to like-numbered elements in the figures. An MIMO radar system includes an exemplary interference management system (also known herein as an interference manager) that that provides for better interference management of the radar system in the presence of other radar systems in proximity. The interference management system or interference manager of the radar system allows the radar system to operate in the presence of other radar systems in proximity. The radar system includes a plurality of transmitters and a plurality of receivers. Each of the plurality of transmitters is coupled to a corresponding antenna, and each of the plurality of receivers is coupled to a corresponding antenna. The transmitter and receiver antennas are used to form a set of virtual antenna locations (virtual receivers). The interference manager selects a time slot or frequency band, or both a time slot and frequency band for transmitter and/or receiver operation to mitigate or avoid interference from the other radar systems.

Figure 1:
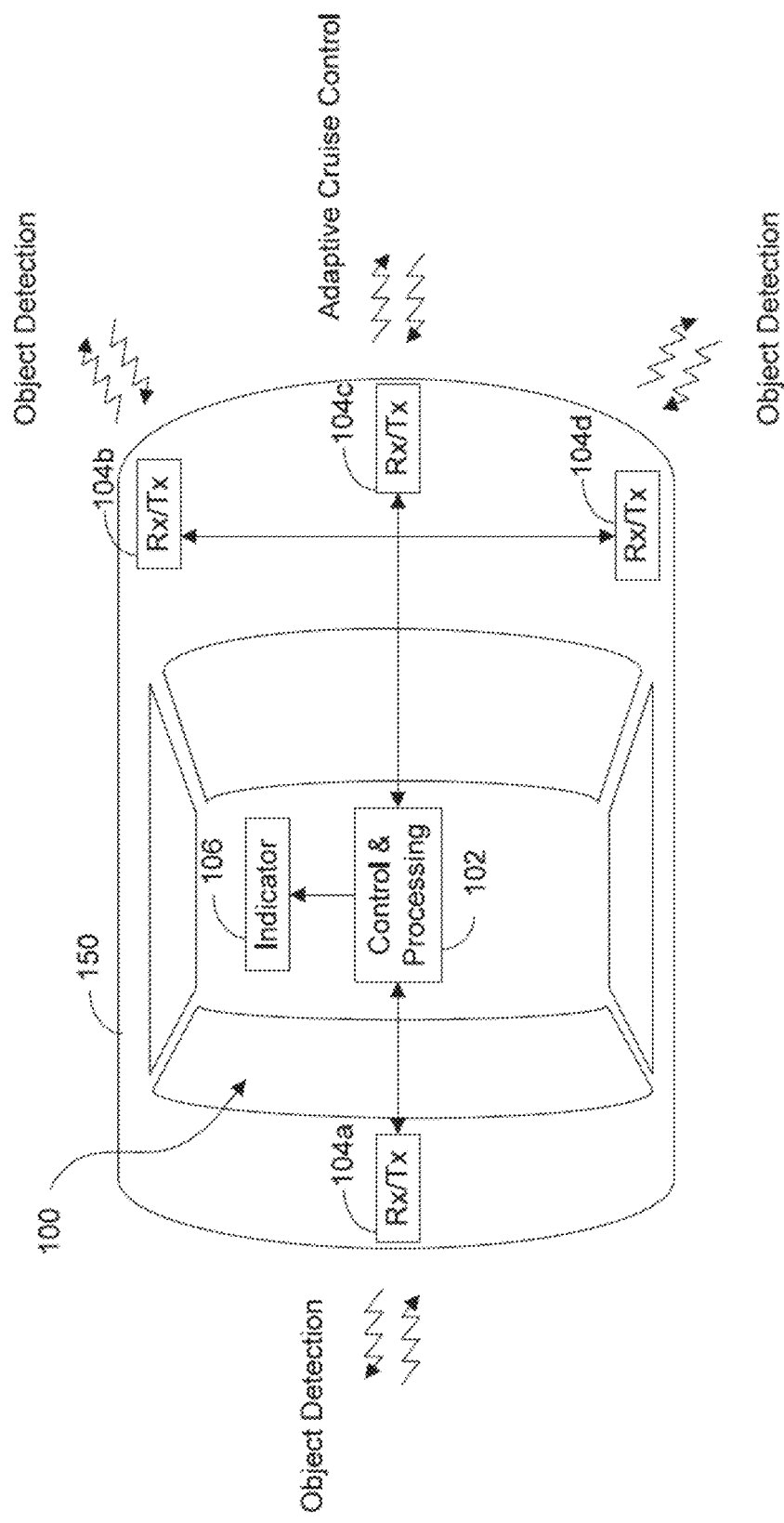
FIG. 1 is a plan view of an automobile equipped with a radar system in accordance with the present invention.

FIG. 1 illustrates an exemplary radar system 100 configured for use in a vehicle 150. In an aspect of the present invention, a vehicle 150 may be an automobile, truck, or bus, etc. The radar system 100 may utilize multiple radar systems (e.g., 104a-104d) embedded in the vehicle 150 (see FIG. 1). Each of these radar systems may employ multiple transmitters, receivers, and antennas (see FIG. 3). These signals are reflected from objects (also known as targets) in the environment and received by one or more receivers of the radar system. A transmitter-receiver pair is called a virtual radar (or sometimes a virtual receiver). As illustrated in FIG. 1, the radar system 100 may comprise one or more transmitters and one or more receivers (104a-104d) for a plurality of virtual radars. Other configurations are also possible. FIG. 1 illustrates the receivers/transmitters 104a-104d placed to acquire and provide data for object detection and adaptive cruise control. As illustrated in FIG. 1, a controller 102 receives and then analyzes position information received from the receivers 104a-104d, and then forwards processed information (e.g., position information) to, for example, an indicator 106 or other similar devices, as well as to other automotive systems. The radar system 100 (providing such object detection and adaptive cruise control or the like) may be part of an Advanced Driver Assistance System (ADAS) for the automobile 150.

An exemplary radar system operates by transmitting one or more signals from one or more transmitters and then listening for reflections of those signals from objects in the environment by one or more receivers. By comparing the transmitted signals and the received signals, estimates of the range, velocity, and angle (azimuth and/or elevation) of the objects can be estimated.

Figure 2B:
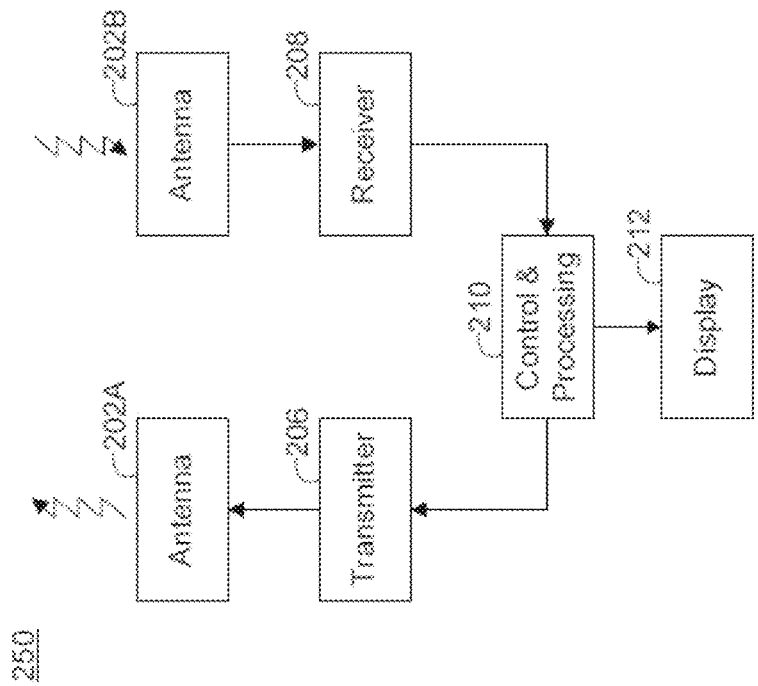
FIGS. 2A and 2B are block diagrams of radar systems in accordance with the present invention.
Figure 2A:
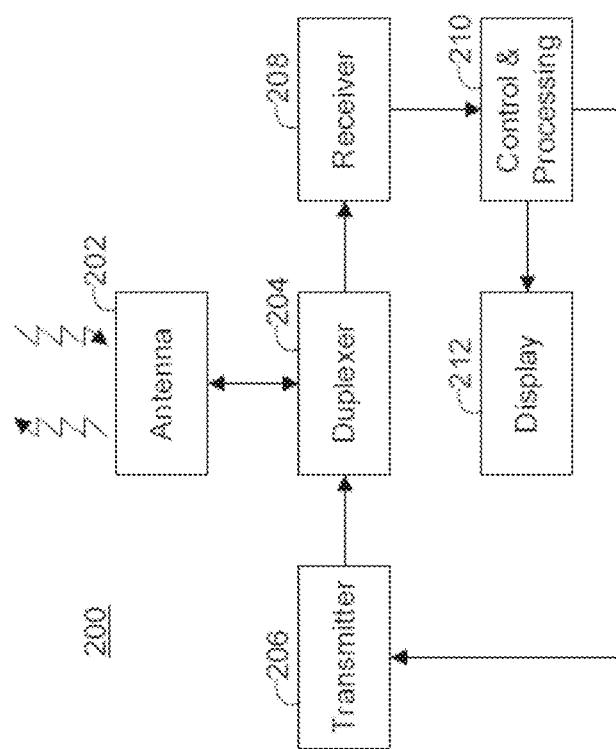

There are several ways to implement a radar system. One way, illustrated in FIG. 2A, uses a single antenna 202 for transmitting and receiving. The antenna 202 is connected to a duplexer 204 that routes the appropriate signal from the antenna 202 to a receiver 208 or routes the signal from a transmitter 206 to the antenna 202. A control processor 210 controls the operation of the transmitter 206 and the receiver 208 and estimates the range and velocity of objects in the environment. A second way to implement a radar system is shown in FIG. 2B. In this system, there are separate antennas for transmitting (202A) and receiving (202B). A control processor 210 performs the same basic functions as in FIG. 2A. In each case, there may be a display 212 to visualize the location of objects in the environment.

Figure 3:
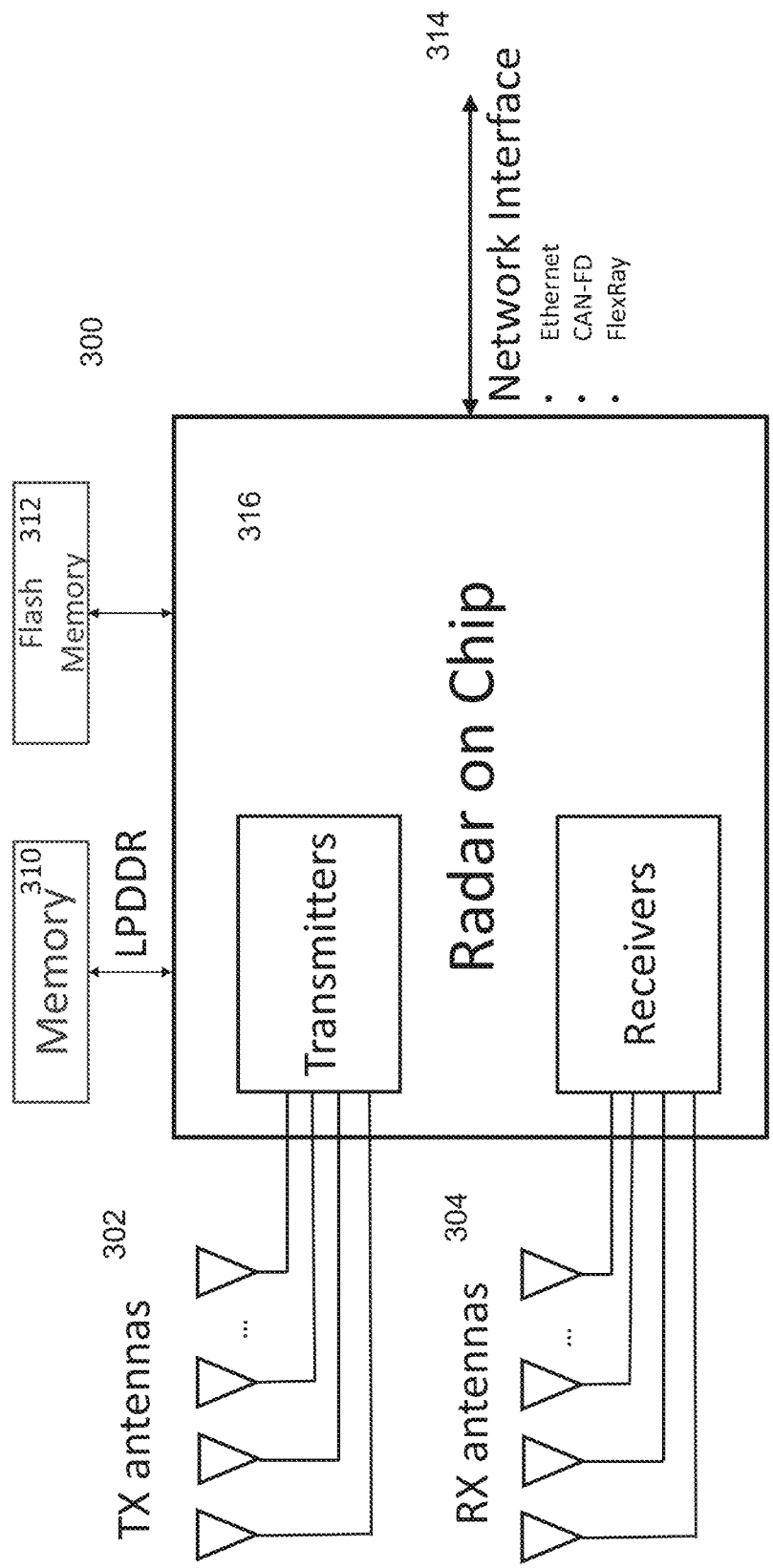
FIG. 3 is a block diagram illustrating a radar system using a single chip with a plurality of receivers and a plurality of transmitters in accordance with the present invention.

A radar system using a single chip with multiple antennas, transmitters, and receivers is shown in FIG. 3. Using multiple antennas 302, 304 allows an exemplary radar system 300 to determine the angle (azimuth or elevation or both) of targets in the environment. Depending on the geometry of the antenna system different angles (e.g., azimuth or elevation) can be determined.

The radar system 300 may be connected to a network via an Ethernet connection or other types of network connections 314, such as, for example, CAN-FD and FlexRay. The radar system 300 may also have memory (310, 312) to store intermediate data and software used for processing the signals in order to determine range, velocity, and location of objects. Memory 310, 312 may also be used to store information about targets in the environment. There may also be processing capability contained in the application-specific integrated circuit (ASIC) 316 (henceforth called the "Radar on Chip" or simply "radar chip") apart from the transmitters 302 and receivers 304.

The description herein includes an exemplary radar system in which there are $N_T$ transmitters and $N_R$ receivers for $N_T \times N_R$ virtual radars, one for each transmitter-receiver pair. For example, a radar system with twelve transmitters and eight receivers will have 96 pairs or 96 virtual radars (with 96 virtual receivers). When three transmitters (Tx1, Tx2, Tx3) generate signals that are being received by three receivers (Rx1, Rx2, Rx3), each of the receivers is receiving the transmission from each of the transmitters reflected by objects in the environment.

There are several different types of signals that transmitters in radar systems employ. A radar system may transmit a pulsed signal or a continuous signal. In a pulsed radar system, the signal is transmitted for a short time and then no signal is transmitted. This is repeated over and over. When the signal is not being transmitted, the receiver listens for echoes or reflections from objects in the environment. Often a single antenna is used for both the transmitter and receiver and the radar transmits on the antenna and then listens to the received signal on the same antenna. This process is then repeated. In a continuous wave radar system, the signal is continuously transmitted. There may be an antenna for transmitting and a separate antenna for receiving.

Another classification of radar systems is the modulation of signal being transmitted. A first type of continuous wave radar signal is known as a frequency modulated continuous wave (FMCW) radar signal. In an FMCW radar system, the transmitted signal is a sinusoidal signal with a varying frequency. By measuring a time difference between when a certain frequency was transmitted and when the received signal contained that frequency, the range to an object can be determined. By measuring several different time differences between a transmitted signal and a received signal, velocity information can be obtained.

A second type of continuous wave signal used in radar systems is known as a phase modulated continuous wave (PMCW) radar signal. In a PMCW radar system, the transmitted signal from a single transmitter is a sinusoidal signal in which the phase of the sinusoidal signal varies. Typically, the phase during a given time period (called a chip period or chip duration) is one of a finite number of possible phases. A spreading code consisting of a sequence of chips, (e.g., +1, +1, −1, +1, −1 . . . ) is mapped (e.g., +1→0, −1→p) into a sequence of phases (e.g., 0, 0, p, 0, p . . . ) that is used to modulate a carrier to generate the radio frequency (RF) signal. The spreading code could be a periodic sequence or could be a pseudo-random sequence with a very large period, so it appears to be a nearly random sequence. The spreading code could be a binary code (e.g., +1 or −1). The resulting signal has a bandwidth that is proportional to the rate at which the phases change, called the chip rate $f_{chip}$, which is the inverse of the chip duration, $T_{chip}=1/f_{chip}$. In a PMCW radar system, the receiver typically performs correlations of the received signal with time-delayed versions of the transmitted signal and looks for peaks in the correlation as a function of the time-delay, also known as correlation lag. The correlation lag of the transmitted signal that yields a peak in the correlation corresponds to the delay of the transmitted signal when reflected off an object. The round-trip distance to the object is found by multiplying that delay (correlation lag) by the speed of light.

In some radar systems, the signal (e.g. a PMCW signal) is transmitted over a short time period (e.g. 1 microsecond) and then turned off for a similar time period. The receiver is only turned on during the time period where the transmitter is turned off. In this approach, reflections of the transmitted signal from very close targets will not be completely available because the receiver is not active during a large fraction of the time when the reflected signals are being received. This is called pulse mode.

Digital frequency modulated continuous wave (FMCW) and phase modulated continuous wave (PMCW) are techniques in which a carrier signal is frequency or phase modulated, respectively, with digital codes using, for example, GMSK. Digital FMCW/PMCW radar lends itself to be constructed in a MIMO variant in which multiple transmitters transmitting multiple codes are received by multiple receivers that decode all codes. The advantage of the MIMO digital FMCW/PMCW radar is that the angular resolution is that of a virtual antenna array having an equivalent number of elements equal to the product of the number of transmitters and the number of receivers. Digital FMCW/PMCW MIMO radar techniques are described in U.S. Pat. Nos. 9,989,627; 9,945,935; 9,846,228; and 9,791,551, which are all hereby incorporated by reference herein in their entireties.

The radar sensing system of the present invention may utilize aspects of the radar systems described in U.S. Pat. Nos. 10,261,179; 9,971,020; 9,954,955; 9,945,935; 9,869,762; 9,846,228; 9,806,914; 9,791,564; 9,791,551; 9,772,397; 9,753,121; 9,689,967; 9,599,702; 9,575,160, and/or 9,689,967, and/or U.S. Publication Nos. US-2017-0309997; and/or U.S. patent application Ser. No. 16/674,543, filed Nov. 5, 2019, Ser. No. 16/259,474, filed Jan. 28, 2019, Ser. No. 16/220,121, filed Dec. 14, 2018, Ser. No. 15/496,038, filed Apr. 25, 2017, Ser. No. 15/689,273, filed Aug. 29, 2017, Ser. No. 15/893,021, filed Feb. 9, 2018, and/or Ser. No. 15/892,865, filed Feb. 9, 2018, and/or U.S. provisional application, Ser. No. 62/816,941, filed Mar. 12, 2019, which are all hereby incorporated by reference herein in their entireties.

Figure 4:
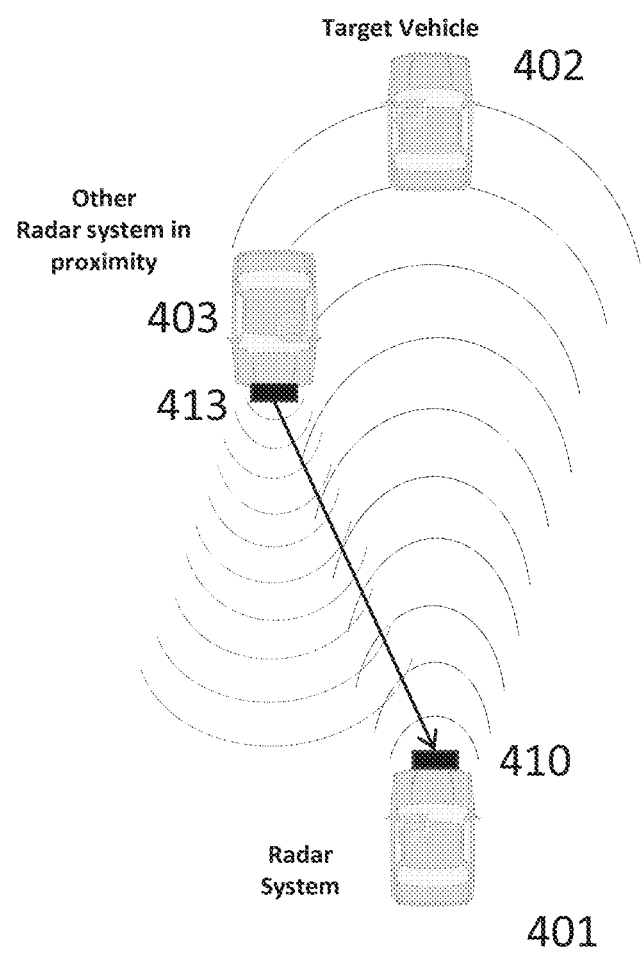
FIG. 4 shows the operation of a radar system in the presence of another radar system in proximity in accordance with the present invention.

Interference Management for Radar Systems:

FIG. 4 illustrates exemplary multiple radar systems (410, 413) operating in proximity. Vehicle 401 is equipped with a radar system 410 that includes an exemplary interference management system 500 (see FIG. 5). Vehicle 402 is a target the radar system 410 is tracking. Other targets may be detected by radar system 410, as well based on the surrounding environment not specifically shown in FIG. 4. Vehicle 402 may or may not be equipped with a radar system. Vehicle 403 is an incoming vehicle equipped with a radar system 413. The radar system 413 may or may not have an interference management system (500) as described herein. The radar system 410 receives the radio signals transmitted by the radar system 413 in addition to the reflections of its own transmitted radio signal from target 402, as well as reflected off of other targets in the environment. The interference management system 500 in the radar system 410 mitigates the impact of the radio signal from the radar system 413 into the radar system 410, as well of that from the radar system 410 into the radar system 413.

Figure 5:
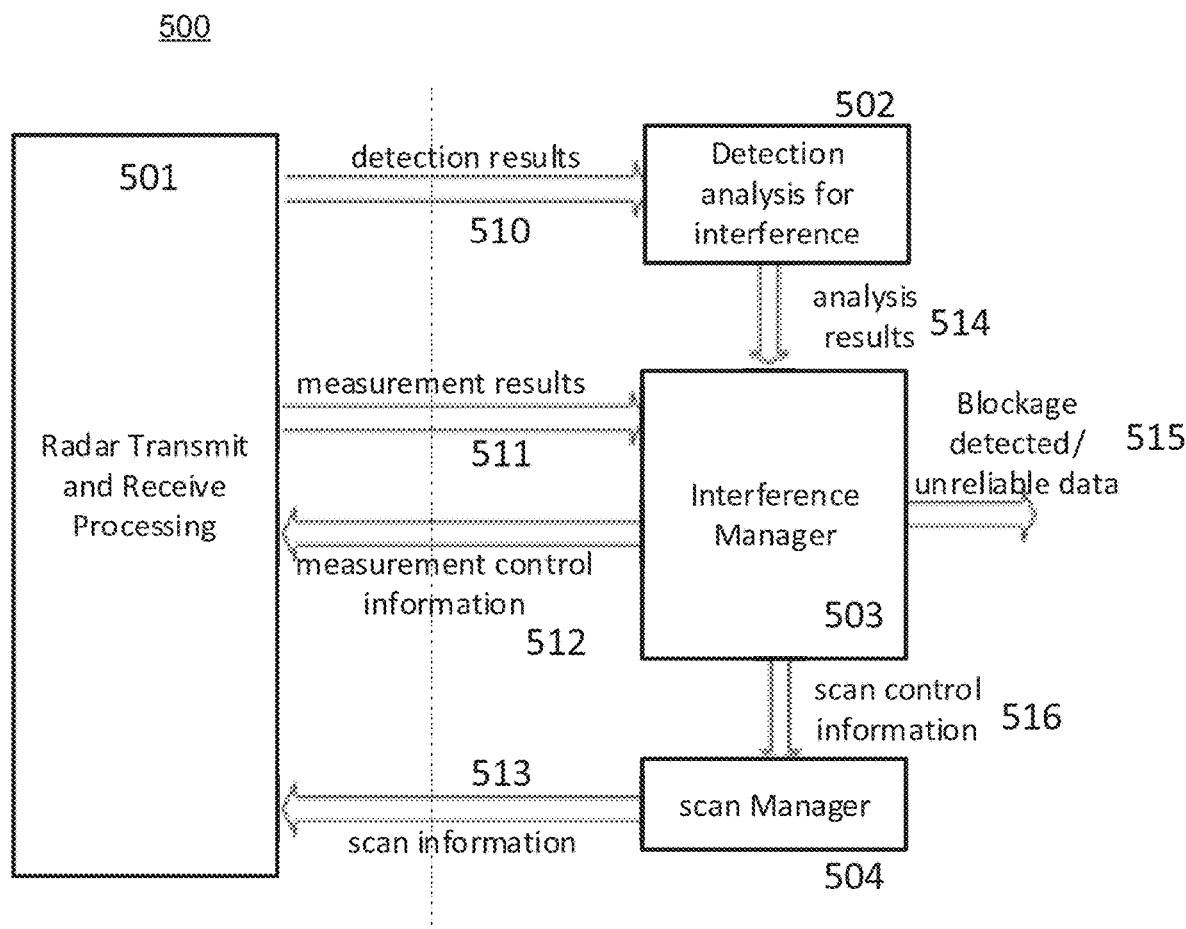
FIG. 5 is a block diagram of a radar system with an interference management system designed to determine the operating characteristics of the interfering signals and choose its operating parameters in accordance with the present invention.

FIG. 5 shows the block diagram of the interference management system 500 in the radar system in accordance with the present invention. The radar system performs various target detections and signal measurements in the radar transmit and receive processing block 501. The detection results 510 include target information with estimated range, Doppler and angle-of-targets as well as information on estimated noise levels at various ranges, Dopplers and angles. An increase in the noise level is used to predict the presence of other radar systems in proximity. The detection analysis block 502 analyzes the noise for interference and provides this information to the interference manager 503. In addition, the measurement results (exemplary measurements are described in subsequent paragraphs) 511 are also provided to the interference manager 503. The interference manager uses these results to decide on the operating parameters of the radio signal transmission and uses this information to create "scan control information" 516. The scan control information 516 includes transmit power of the radio signal; receive gain of the analog front end; and the time slot or the frequency band or both of the radio signal. The scan manager 504 uses this information and provides the "scan information" 513 to the radar transmit and receive processing block 501 which in turn creates the radio signal for transmission according to the "scan information" 513. The interference manager 503 may also decide that the current interference level is too high to provide reliable detection of targets and thus provides this information 515 to other parts in the overall system (for example the control and processing block 102 in FIG. 1). The interference manager 503 also provides control information 512 regarding what types of signal measurements are needed and at what intervals.

Figure 6:
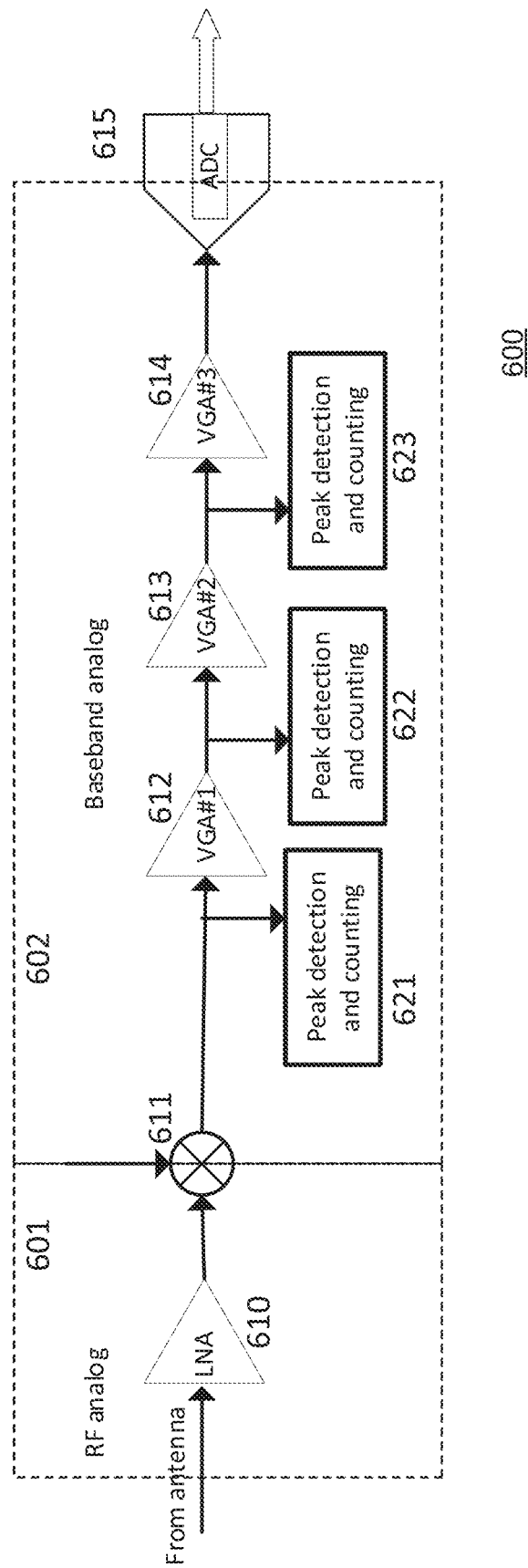
FIG. 6 shows a block diagram of a measurement system for determining the presence of interfering signals in the analog receive path of the radar system in accordance with the present invention.

FIG. 6 illustrates an exemplary measurement of the signal in the receive analog baseband 600 divided into the RF section 601 and the baseband section 602. Each receive antenna (as shown in FIG. 3 in a radar system) is connected to the Low Noise Amplifier (LNA) 610 operating in the RF frequency band of the operating radio signal. The mixer 611 down-converts the RF signal into baseband. The baseband signal passes through a series of Voltage Gain Amplifiers (VGA) 612/613/614 before being converted into digital by the Analog to Digital Converter (ADC) 615. The VGAs also include low pass filtering to reject the signal contents outside the signal frequency band(s) of interest and thus help to reduce the interfering signals outside the operating frequency band. In addition, peak detection and counting circuit blocks 621/622/623 are added to at various stages in the receive baseband path. In FIG. 6, the peak detection and counting blocks 621/622/623 operate at the input of the VGAs 612/613/614 respectively.

Figure 7:
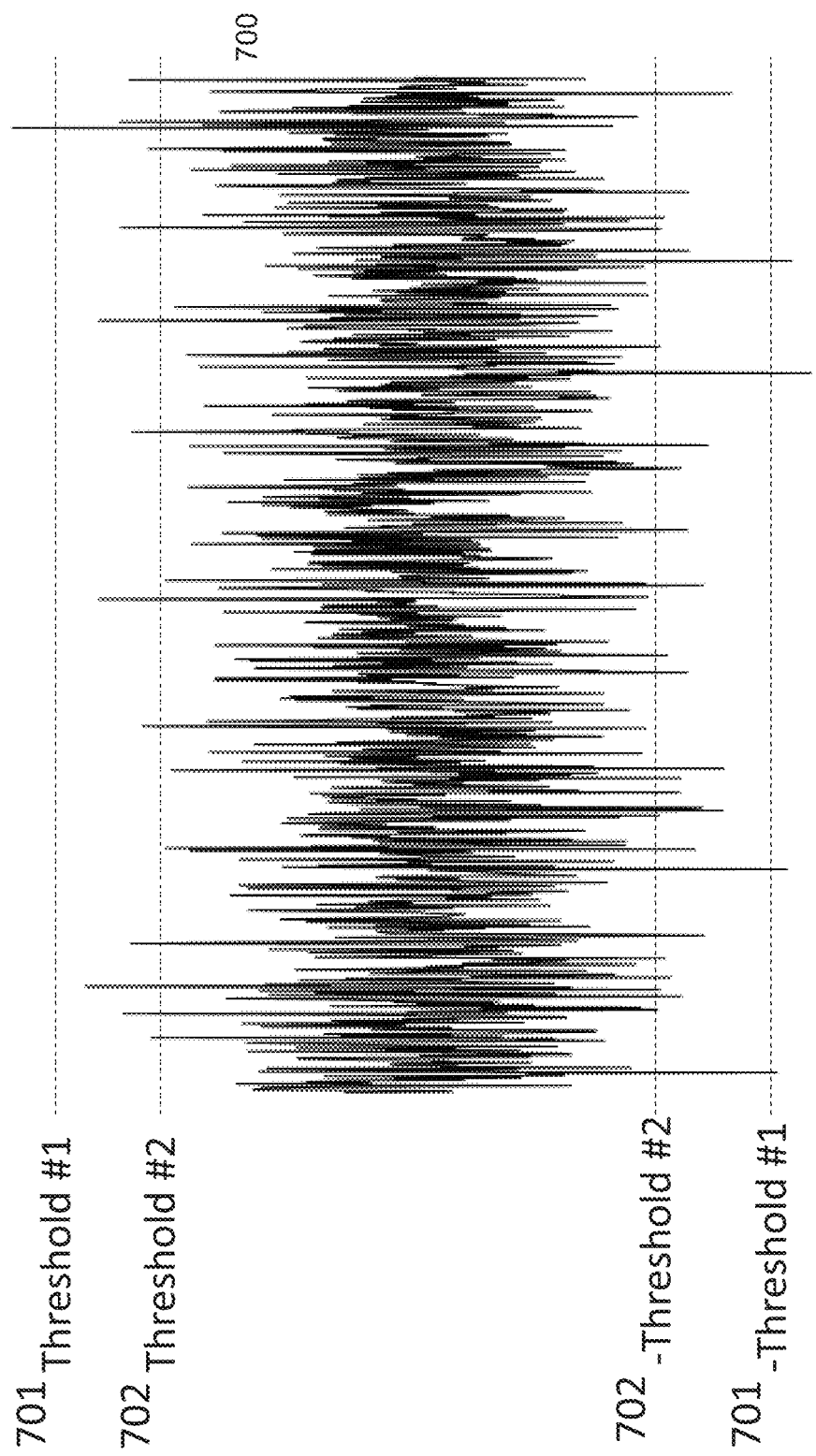
FIG. 7 is a diagram illustrating the detection of interfering signals in accordance with the present invention.

The peak detector and counting blocks 621/622/623 count the fraction of the signal level that exceeds a pre-determined threshold in a pre-determined temporal window. Since the interfering signal may have different characteristics (e.g., a different peak to average ratio depending on different signaling schemes, e.g., FMCW vs PMCW, and time division MIMO vs code division MIMO), multiple thresholds can be used to get better signal statistics. FIG. 7 shows an exemplary baseband analog signal 700 and two thresholds: threshold 701 with +/−(threshold #1) and threshold 702 with +/−(threshold #2). The fraction of time the signal levels exceed each threshold is provided to the interference manager block 503 in FIG. 5.

Figure 8:
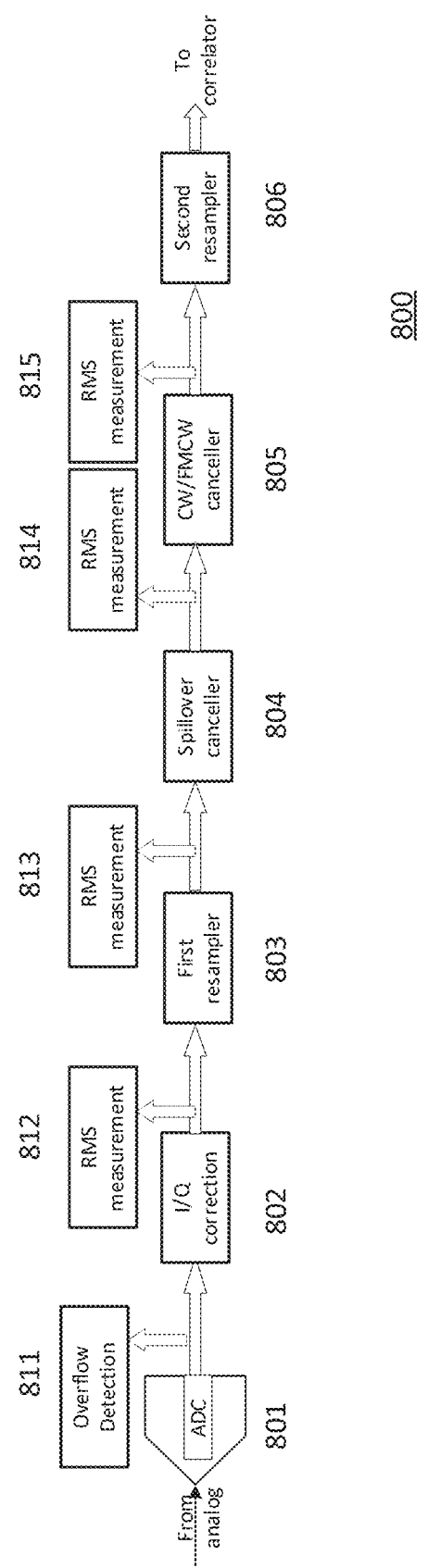
FIG. 8 is a flow diagram for determining the presence of interfering signals in the digital receive path in accordance with the present invention.

FIG. 8 shows an exemplary measurement process 800 for a signal in the digital domain before processing the signal for range, Doppler, and angle for target analysis. The digital front end path 800 consists of the Analog to Digital Converter (ADC) 801 (same block 615 in FIG. 6 renumbered here for convenience) followed by a series of various signal processing blocks: I/Q mis-correction block 802 to reduce the I/Q mis-match that occurs in analog circuit blocks, a first filtering and re-sampler block 803 to reduce signal bandwidth, a spillover correction block 804 to reduce any spillover from own signal transmit, a CW/FMCW canceller block 805 to reduce any Continuous Wave (CW) or FMCW interfering signals from other radar in proximity, and second filtering and re-sampler block 806 to reduce signal bandwidth to the transmitted chip rate in the PMCW digital radars. An overflow detection block 811 after the ADC 801 monitors if the signal is exceeding the expected values indicating if the analog signal before the ADC is saturating. Various RMS measurement blocks at the output of various signal processing blocks measure the average signal energy levels. The exemplary implementation shows the RMS blocks 812/813/814/815 after the signal processing blocks 802/803/804/805 respectively. The measurement results from the blocks 811/812/813/814/815 are forwarded to the interference manager block 503 in FIG. 5.

The exemplary measurements illustrated in FIGS. 6 and 8 are done during a time interval when the transmitter of the radar system is inactive, so the measurements accurately reflect the energy of the radio signals. An increase in the signal levels monitored by these blocks provide indications of the presence of interfering radio signals. In addition, a difference in signal energy measure by the RMS blocks 814 and 815 in FIG. 8 (before and after CW/FMCW) indicates the presence of interfering radar with Continuous Wave (CW) or FMCW radio transmissions.

Figure 9:
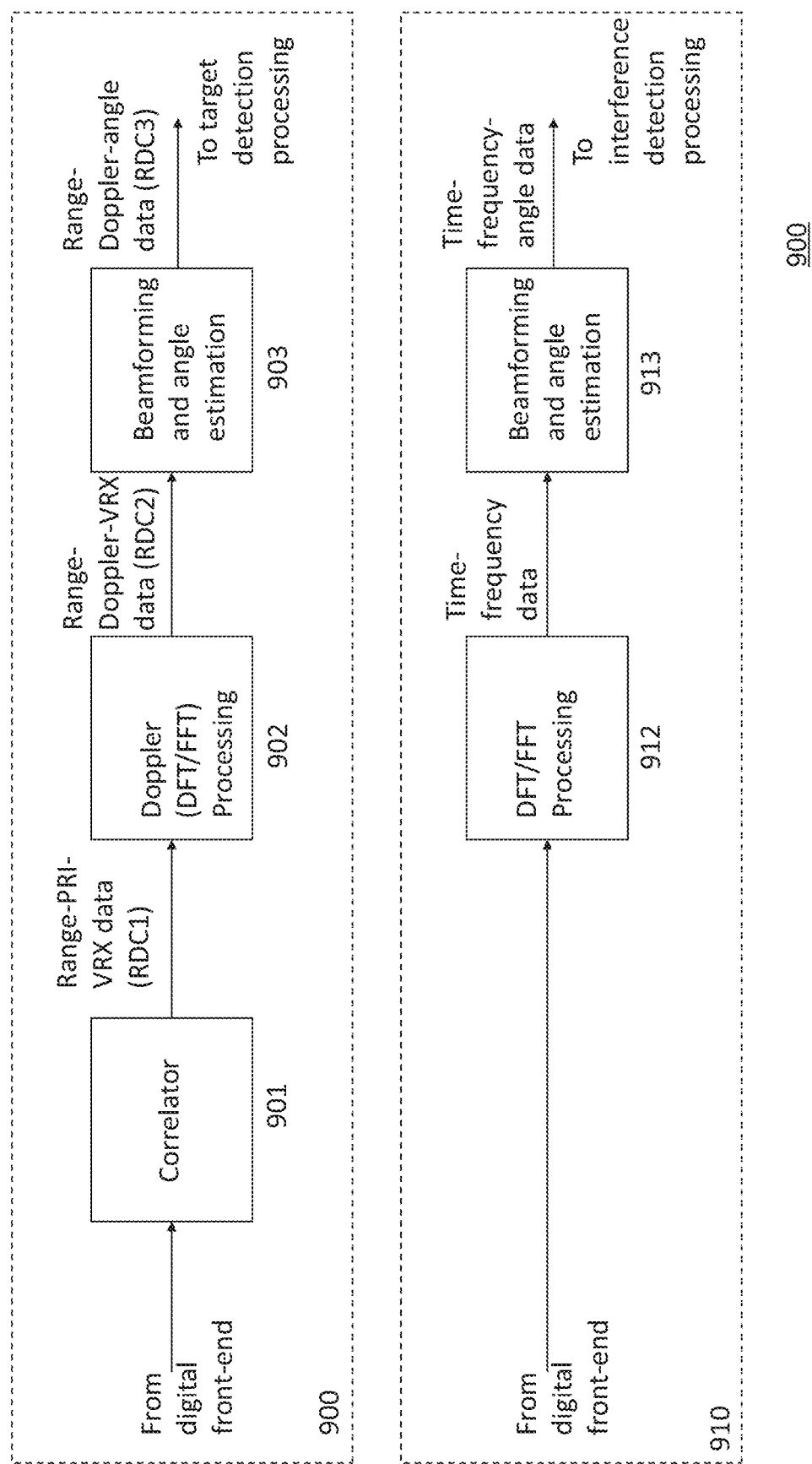
FIG. 9 shows a block diagram for creating range, Doppler, angle data in a digital radar and its use to estimate the time slot and frequency band as well as the direction of the interfering signals in accordance with the present invention.

FIG. 9 illustrates an exemplary signal processing block 900 for target processing that takes the output from the digital front end 800 (FIG. 8) and coverts the output to range, Doppler, and angle data or the Radar Data Cube #3 (RDC3). The signal processing block 900 consists of a correlator unit 901 that converts the incoming data into range-PRI (Pulse Repetition Interval)-virtual receiver data or the Radar Data Cube #1 (RDC1); a Doppler processing unit 902 that uses the Discrete Fourier Transform (DFT) or alternately the Fast Fourier Transform (FFT) to convert the RDC1 into range-Doppler-virtual receiver data or the Radar Data Cube #2 (RDC2); and a beamforming and angle processing unit 903 that converts RDC2 data into RDC3 data. The RDC3 data is used for target processing and detection, the output of which is passed to the detection analysis block 502 in FIG. 5. FIG. 9 also illustrates an exemplary interference signal measurement block 910 that consists of an FFT processing block 912 that converts the data from the digital front end 800 into time frequency data, followed by a beamforming and angle estimation unit 913 that creates time-frequency-angle information of the interference signal. In FIG. 9, the units in the signal processing block 900 for target processing can be reused for interference signal measurement block 910. As illustrated in FIG. 9, in the interference signal measurement block 910 (as compared to the signal processing block 900), the correlator 901 is bypassed, the Doppler Processing unit 902 is re-used for DFT/FFT processing 912, and the beamforming and angle estimate unit 903 is re-used for beamforming and angle estimate unit 913. In the signal processing block 900, the beamforming unit 903 uses a virtual antenna consisting of the transmit and receive antenna (or a subset of them), whereas in the interference signal measurement block 910, the beamforming unit 913 only uses the receive antennas (or a subset of them). The measurement of the interfering signal is done during a time interval when the transmitter of the radar system is inactive.

Figure 10:
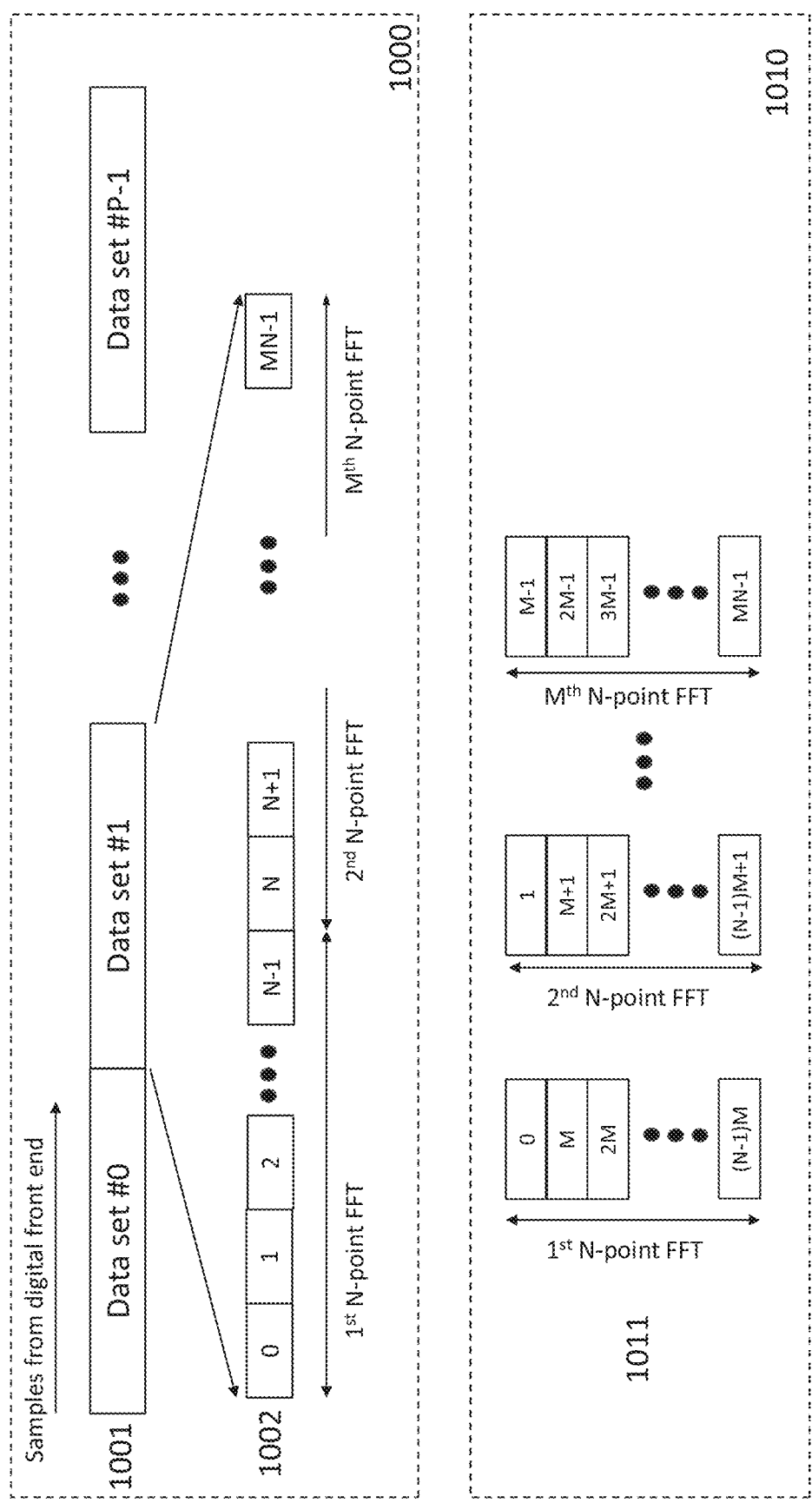
FIG. 10 shows the processing of data to estimate the time slot and frequency band of the interfering signals in accordance with the present invention.

FIG. 10 shows an exemplary data flow through the interference signal measurement block 910 in FIG. 9. The data flow case 1000 uses successive samples divided into temporal data sets to process. Each data set 1001 consists of MN samples. There are P such sets, successive in time, than are analyzed. Each data set is divided into MN-sample data slots 1002, where the N samples are consecutive samples in time. N-point DFT/FFT is performed in each slot and the M such DFT/FFT's are averaged. The first N-point DFT/FFT is performed using samples numbered 0, 1 . . . N−1, the second N-point DFT/FFT is performed using samples numbered N, N+1 . . . 2N−1, and so on. In an alternate embodiment, the samples within a data set are sampled at intervals of M samples creating the structure 1011. The first N-point DFT/FFT is performed using samples numbered 0, M, . . . , (N−1)M, the second N-point on samples numbered 1, M+1, . . . (N−1)M+1 and so on. 1011 has better frequency resolution than 1002 due to its larger temporal width of the samples covering 0 to NM-1 samples during DFT/FFT analysis at expense of the possibility of aliasing in the detected frequency.

Figure 11:
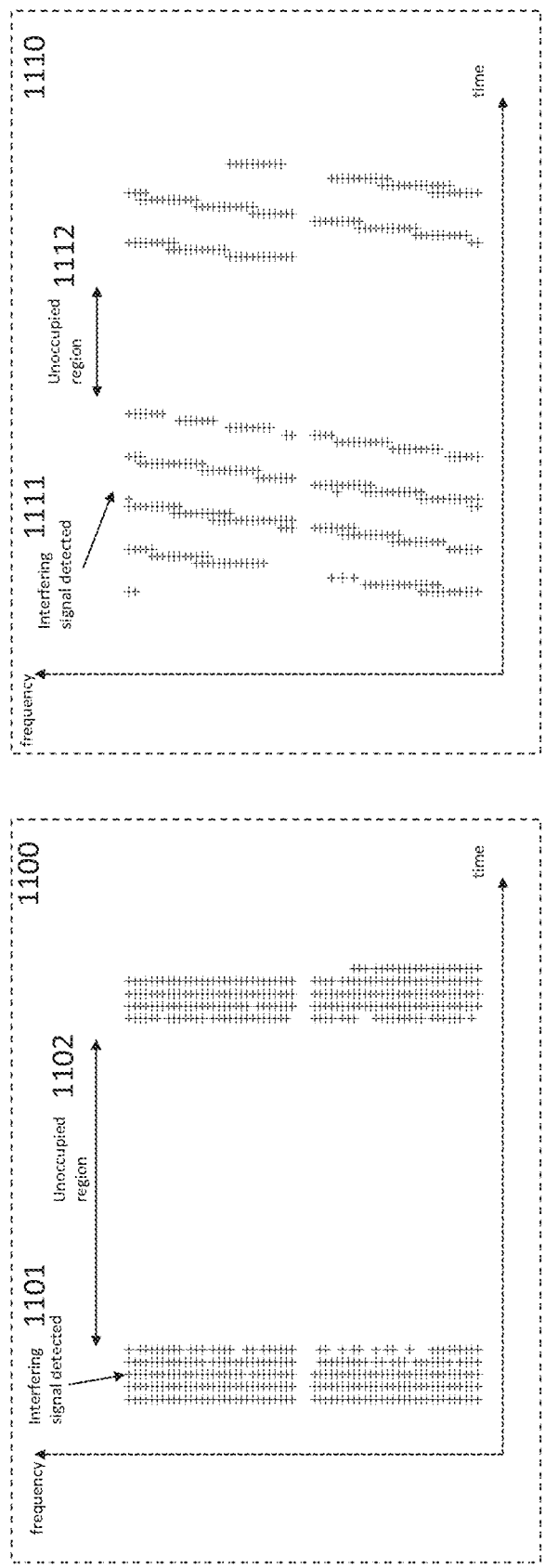
FIG. 11 illustrates an exemplary estimation of unoccupied time and frequency region that can be used by the radar system in accordance with the present invention.

FIG. 11 presents exemplary results of time frequency analysis based on interference signal measurement block 910 in FIG. 9. An exemplary graph 1100 shows the detected signal on discrete time frequency bins for an interfering radar transmitting PMCW signal. When the interfering radar is transmitting, it occupies a finite duration in time and frequency 1101. The gap 1102 indicates an unoccupied region not used by the interfering radar. The exemplary signal graph 1111 shows the signal energy on discrete time frequency bins for an interfering radar transmitting FMCW signal. The chirps, which are linearly varying frequency with time, can be observed. The signal graph 1111 illustrates the time-frequency region occupied by the interfering radar whereas the signal graph 1112 illustrates the unused region. The signal energy on discrete time frequency bins are provided to the interference manager block 503 in FIG. 5.

The interference manager 503 in FIG. 5 receives the various interference measurements and uses all the indicators described above to choose various parameters of radio transmission for radar operation. Exemplary parameters include a transmit power of active transmission, a receive gain of the analog front end, a time slot of active transmission, and a frequency band of operation. FIG. 12 illustrates an exemplary use case for choosing a time slot or a frequency band or both. Time graph 1200 illustrates an exemplary case for choosing an unoccupied time slot for active transmission. Time slots 1201 and 1202 of FIG. 12 are two time slots used by the interfering radars, as indicated by the measurement received by the interference manager. As illustrated in FIG. 12, the interference manager chooses the time slot 1203 for its own active transmission. Similarly, frequency graph 1210 illustrates an exemplary case of choosing an unoccupied frequency band for active transmission. Frequency bands 1211 and 1212 of FIG. 12 are the frequency bands used by the interfering radars. The interference manager chooses the frequency band 1203 in the unoccupied frequency region for its own active transmission. Time/frequency graph 1220 illustrates an exemplary case where both the time slot and the frequency band are simultaneously used to find an unoccupied area of transmission. Time-frequency bands 1221 and 122 of FIG. 12 are time-frequency bands used by the interfering radar, and the interfering manager uses time-frequency band 1223 from the unoccupied region in the time frequency plane to decide the time slot and the frequency band of operation during active transmission.

In an exemplary case where the measurements received by the interference manager indicates that the any part in the analog signal path in FIG. 6 is in a compression or saturation region, the interference manager may decide to reduce the receive path gain in the VGAs of the analog signal path. The interference manager may also decide to reduce the transmit power of the radio signal if it may interfere with the operation of the other (interfering) radars in proximity. Such a case may occur when the measurements received by the interference manager indicate there are no large enough unoccupied regions available over which a radio transmission can be made. In this exemplary case, the interference manager may also randomly change the time slot, or the frequency band, or both, for active transmission. The latter case is equivalent to time/frequency hopping.

Thus, a MIMO radar system with an exemplary interference management system provides for interference management of the MIMO radar system when in the presence of other radar systems. The MIMO radar system includes a plurality of transmitters and a plurality of receivers. The interference management system is configured to receive and process signal data from the transmitters and receivers to detect the presence of interference. When the interference management system determines that interference (from other radar systems) is present, the interference management system determines either a time slot, or a frequency band, or both, for transmitter/receiver operation to avoid the interference.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A multiple input, multiple output (MIMO) radar system, the MIMO radar system comprising:
a plurality of transmitters configured to transmit radio signals;
a plurality of receivers configured to receive radio signals that include radio signals transmitted by the transmitters and reflected off objects in an environment, wherein the received radio signals also include interfering radio signals transmitted by other radar systems, wherein the plurality of receivers is configured to measure the received radio signals for interference during selected time periods when the plurality of transmitters is not transmitting, and wherein the plurality of receivers is configured to receive the received radio signals while the plurality of transmitters is transmitting and while the plurality of transmitters is not transmitting;
an interference manager configured to control the plurality of transmitters and the plurality of receivers to avoid and/or mitigate interference from the other radar systems, wherein the interference manager is configured to analyze the received radio signal measurements to detect interfering radio signals, wherein the interference manager is operable to select a time slot, frequency band, or a time slot/frequency band for transmitter/receiver operation to avoid the interference, wherein the interference is detected interference, and wherein the plurality of receivers is configured to process the received radio signals to detect at least one object in the environment.

2. The MIMO radar system of claim 1, wherein the interference manager is configured to receive and process data from the transmitters and the receivers to detect the presence of interfering radio signals, and wherein the interference manager is configured to control the receivers such that a particular time period is selected to perform the received radio signals measurement.

3. The MIMO radar system of claim 2, wherein the interference manager is operable to determine that interfering radio signals are present when the received radio signals measured during the selected time periods are above a threshold.

4. The MIMO radar system of claim 1, wherein the interference manager is operable to selectively control transmitter/receiver operation when interference is present.

5. The MIMO radar system of claim 1, wherein the interference manager is operable to identify the interfering radio signals included in the received radio signals.

6. The MIMO radar system of claim 5, wherein the interference manager is operable to analyze the interfering radio signals to identify time slots where the interference is present and time slots where the interference is not present, and wherein the interference manager is operable to select a time slot where the interference is not present.

7. The MIMO radar system of claim 6, wherein the interference manager is operable to analyze the interfering radio signals to identify a frequency band of the interfering radio signals, and wherein the interference manager is operable to select a frequency band for transmitter/receiver operation based upon the identified frequency band of the interfering radio signals.

8. The MIMO radar system of claim 7, wherein the interference manager is operable to select a time slot and frequency band for transmitter/receiver operation based upon the identified time slots and frequency bands without interference.

9. The MIMO radar system of claim 7, wherein the interference manager is operable to lower transmitter power and/or lower receiver gain when the interference manager determines a sufficient time slot and/or frequency band without interference is unavailable.

10. The MIMO radar system of claim 7, wherein the interference manager is operable to randomly change a transmission time slot and/or frequency band, or both the time slot and frequency band for transmitter and/or receiver operation.

11. A method for managing a multiple input, multiple output (MIMO) radar system to avoid interference from other radar systems, the method comprising:
  transmitting, with a plurality of transmitters, radio signals;
  receiving, with a plurality of receivers, radio signals that include radio signals transmitted by the transmitters and reflected off objects in an environment, wherein the received radio signals also include interfering radio signals transmitted by other radar systems;
  measuring, with the plurality of receivers, the received radio signals for interference during selected time periods when the plurality of transmitters is not transmitting, wherein the plurality of receivers receive the received radio signals while the plurality of transmitters is transmitting and while the plurality of transmitters is not transmitting;
  detecting the presence of the interfering radio signals by analyzing the received radio signal measurements to detect interfering radio signals;
  selecting a time slot, frequency band, or a time slot and frequency band for transmitter/receiver operation to avoid or mitigate the detected interference from the other radar systems; and
  processing, with the plurality of receivers, the received radio signals to detect at least one object in the environment.

12. The method of claim 11 further comprising receiving and processing data from the transmitters and the receivers to detect the presence of interfering radio signals, and controlling the receivers such that a particular time period is selected to perform the received radio signals measurement.

13. The method of claim 12 further comprising determining that interfering radio signals are present when the received radio signals measured during the selected time periods are above a threshold.

14. The method of claim 11 further comprising selectively controlling transmitter and/or receiver operation when interference is determined to be present.

15. The method of claim 11 further comprising identifying the interfering radio signals included in the received radio signals.

16. The method of claim 15 further comprising analyzing the interfering radio signals to identify time slots where the interference is present and to identify time slots where the interference is not present, and selecting a time slot where the interference is not present.

17. The method of claim 16 further comprising identifying a frequency band of the interfering radio signals, and selecting a frequency band for transmitter and/or receiver operation based upon the identified frequency band of the interfering radio signals.

18. The method of claim 17 further comprising selecting both a time slot and a frequency band for transmitter and/or receiver operation based upon the identified time slots and frequency without interference.

19. The method of claim 17 further comprising lowering transmitter power and/or lowering receiver gain when a sufficient time slot and/or frequency band without interference is unavailable.

20. The method of claim 17 further comprising randomly changing a transmission time slot and/or frequency band, or both the time slot and frequency band for transmitter and/or receiver operation.

* * * * *